(12) United States Patent
Kim et al.

(10) Patent No.: US 10,027,524 B2
(45) Date of Patent: Jul. 17, 2018

(54) METHOD AND APPARATUS FOR TRANSMITTING REFERENCE SIGNAL

(71) Applicant: LG ELECTRONICS INC., Seoul (KR)

(72) Inventors: Bonghoe Kim, Anyang-si (KR);
Dongyoun Seo, Anyang-si (KR);
Hyangsun You, Anyang-si (KR);
Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/426,799

(22) Filed: Feb. 7, 2017

(65) Prior Publication Data

US 2017/0149598 A1    May 25, 2017

Related U.S. Application Data

(63) Continuation of application No. 14/384,574, filed as application No. PCT/KR2013/002458 on Mar. 25, 2013, now Pat. No. 9,602,258.
(Continued)

(51) Int. Cl.
*H04W 4/00*    (2018.01)
*H04L 27/26*    (2006.01)
(Continued)

(52) U.S. Cl.
CPC ...... *H04L 27/2649* (2013.01); *H04J 11/0073* (2013.01); *H04J 11/0076* (2013.01); *H04L 5/0048* (2013.01); *H04J 2211/005* (2013.01)

(58) Field of Classification Search
None
See application file for complete search history.

(56) References Cited

U.S. PATENT DOCUMENTS

2010/0135242 A1    6/2010    Nam et al.
2010/0195566 A1    8/2010    Krishnamurthy et al.
(Continued)

FOREIGN PATENT DOCUMENTS

WO    2011/103186    8/2011

OTHER PUBLICATIONS

NEC Group, "Discussion on time frequency synchronisation for the extension carrier," TSG-RAN WG1#67, R1-113869, Nov. 2011, 5 pages.
(Continued)

*Primary Examiner* — Anh-Vu Ly
(74) *Attorney, Agent, or Firm* — Lee, Hong, Degerman, Kang & Waimey

(57) ABSTRACT

Disclosed are a method and an apparatus for transmitting a reference signal. The method for transmitting the reference signal comprises the step of: transmitting a secondary synchronization signal (SSS) and a primary synchronization signal (PSS) from a subframe including an N (natural number wherein N>1) number of resource blocks (RB) and a plurality of orthogonal frequency division multiplexing (OFDM) symbols; and transmitting from the subframe the reference signal which is generated on the basis of a cell identifier, wherein the reference signal can be transmitted from an M (natural number wherein K<=M<N) number of RBs which includes a K number of RBs in the OFDM symbols that remain after excluding the OFDM symbols from which the SSS and the PSS are transmitted. As a result, demodulation capability of a terminal can be increased.

14 Claims, 17 Drawing Sheets

Related U.S. Application Data

(60) Provisional application No. 61/614,540, filed on Mar. 23, 2012.

(51) Int. Cl.
*H04J 11/00* (2006.01)
*H04L 5/00* (2006.01)

(56) References Cited

U.S. PATENT DOCUMENTS

| | | | |
|---|---|---|---|
| 2010/0246456 A1 | 9/2010 | Suo et al. | |
| 2011/0149886 A1* | 6/2011 | Xu | H04B 7/0628 370/329 |
| 2011/0261679 A1* | 10/2011 | Li | H04L 1/1812 370/216 |
| 2012/0093122 A1 | 4/2012 | Dai et al. | |
| 2012/0147843 A1 | 6/2012 | Pison et al. | |
| 2013/0094411 A1* | 4/2013 | Zhang | H04L 5/0048 370/281 |
| 2013/0201975 A1* | 8/2013 | Chen | H04W 72/0446 370/336 |
| 2013/0343318 A1* | 12/2013 | Gruet | H04L 5/001 370/329 |
| 2015/0055574 A1 | 2/2015 | Kim et al. | |

OTHER PUBLICATIONS

Huawei, et al., "Time- and frequency tracking on additional carrier types," 3GPP TSG RAN WG1 meeting #68, R1-120019, Feb. 2012, 6 pages.

Huawei, et al., "Downlink reference signals for additional carrier types," 3GPP TSG RAN WG1 meeting #68, R1-120020, Feb. 2012, 4 pages.

Samsung, "Time and frequency tracking on new carrier type," 3GPP TSG RAN WG1 Meeting #68, R1-120163, Feb. 2012, 5 pages.

PCT International Application No. PCT/KR2013/002458, Written Opinion of the International Searching Authority dated Jun. 27, 2013, 1 page.

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211, V10.4.0, Dec. 2011, XP050555010, 102 pages.

Huawei, et al., "Time- and frequency tracking on additional carrier types," 3GPP TSG RAN WG1 Meeting #68, R1-120019, Feb. 2012, XP050562608, 6 pages.

Nokia, et al., "Time/Frequency Tracking Performance on New Carrier Type," 3GPP TSG-RAN WG1 Meeting #68bis, R1-121266, Mar. 2012, XP050599555, 8 pages.

ZTE, "Discussion on some issues of additional carrier types," 3GPP TSG-RAN WG1 Meeting #67, R1-113754, Nov. 2011, XP050561867, 4 pages.

Motorola Mobility, "Characteristics of Additional Carrier Types," 3GPP TSG-RAN WG1 #67, R1-114020, Nov. 2011, XP050562293, 6 pages.

Qualcomm Incorporated, "Acquistion, time and frequency tracking for the new carrier type," 3GPP TSG RAN WG1 #68, R1-120536, Feb. 2012, XP050563361, 4 pages.

European Patent Office Application Serial No. 13764444.9, Search Report dated Oct. 30, 2015, 12 pages.

* cited by examiner

FIG. 7
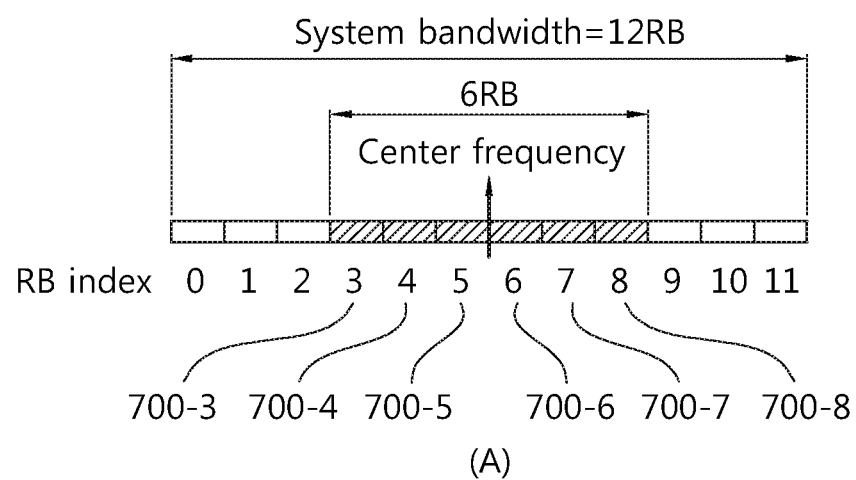
(A)
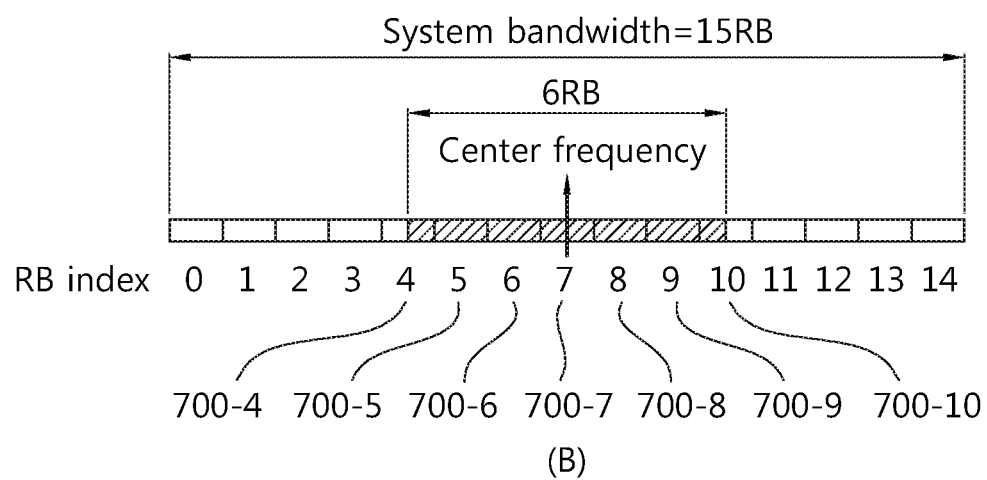
(B)

FIG. 8
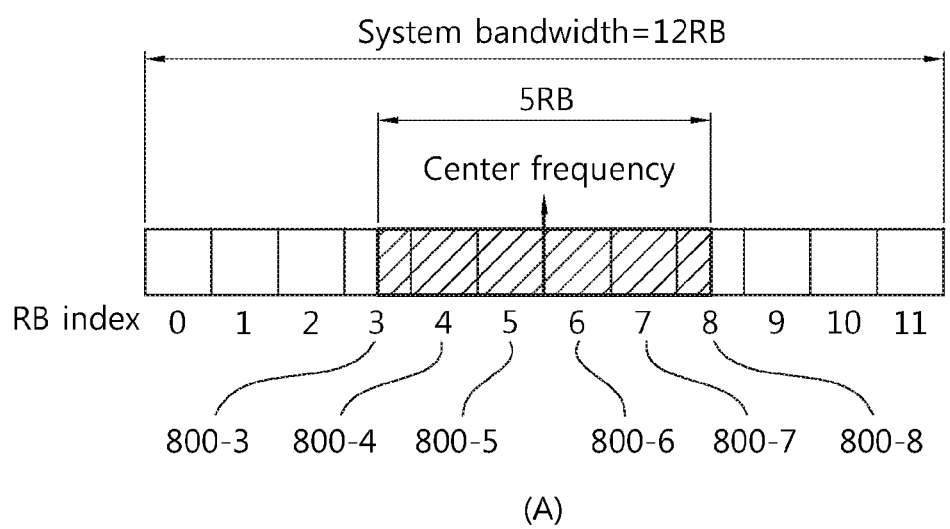
(A)
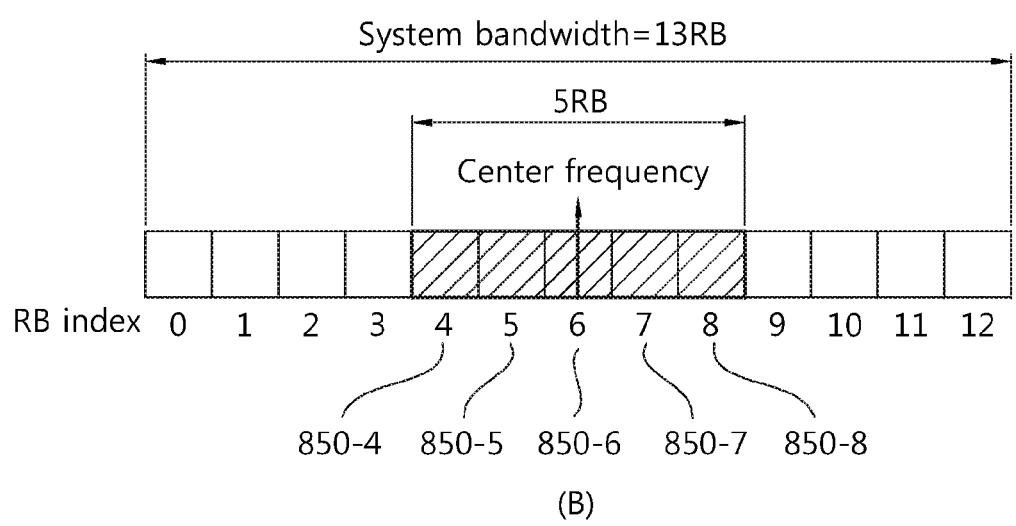
(B)

- PSCH (Primary Synchronization Channel)
- SSCH (Secondary Synchronization Channel)
- PBCH (Physical Broadcast Channel) (1505)
- CRS for selected Tx antenna port 0 (950-1)
- CRS for selected Tx antenna port 1 (950-2)
- PHICH (Physical Hybrid ARQ (Automatic Repeat reQuest) Indicator Channel)
- PDCCH (Physical Downlink Control Channel)
- Available for PDSCH (Physical Downlink Shared Channel)

FIG. 12
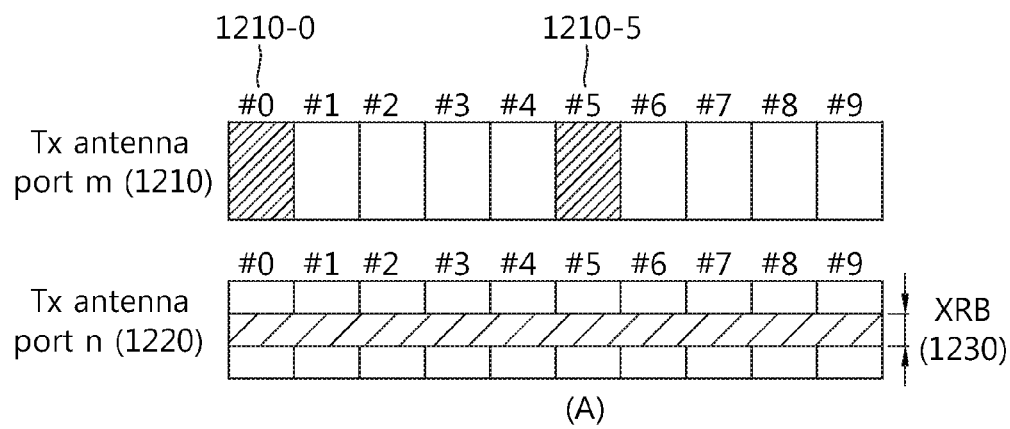
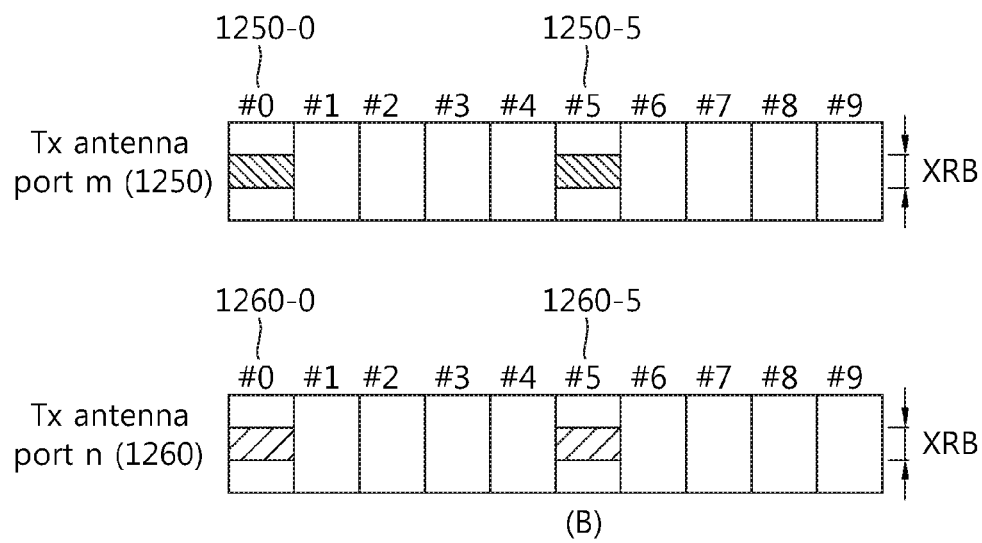

FIG. 13
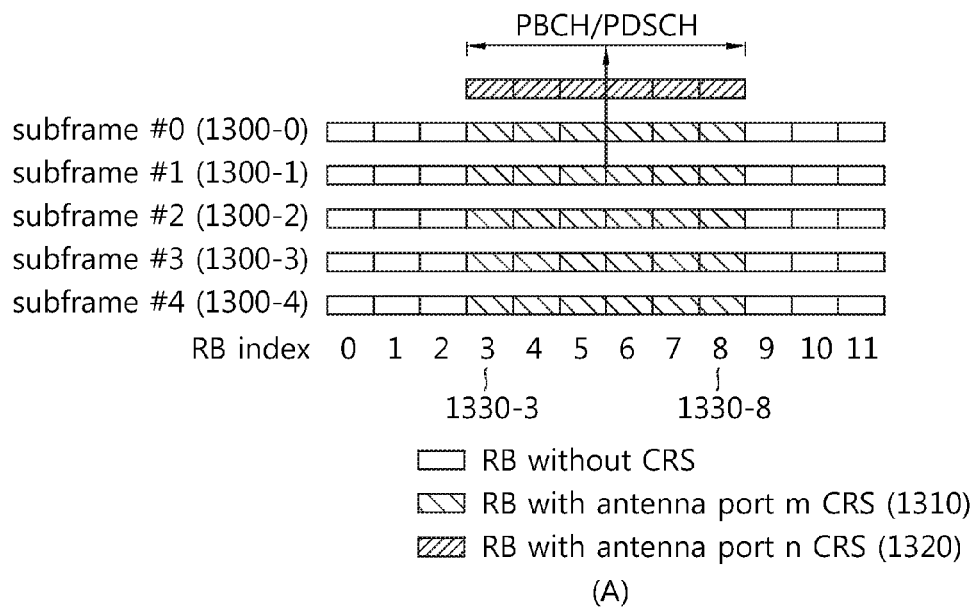
(A)
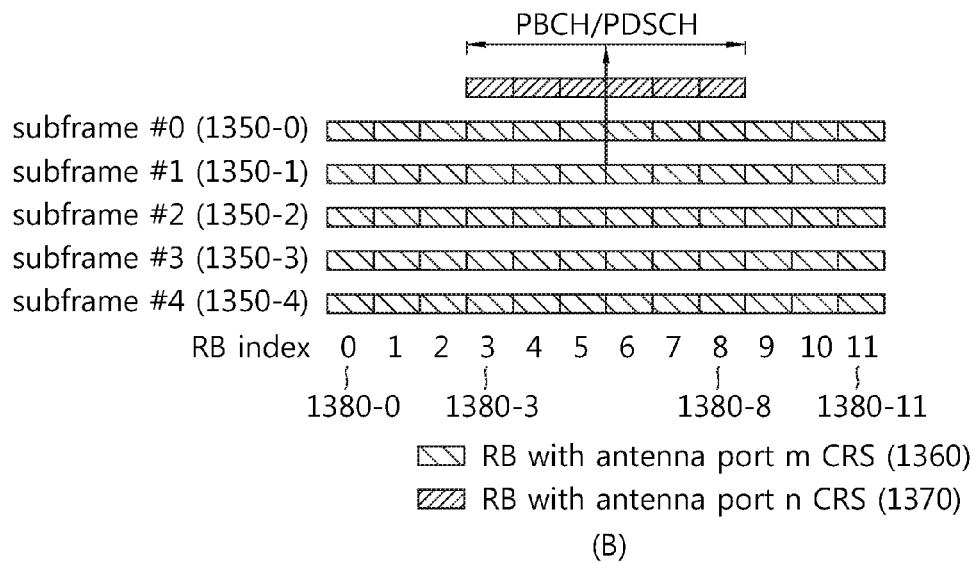
(B)

FIG. 14
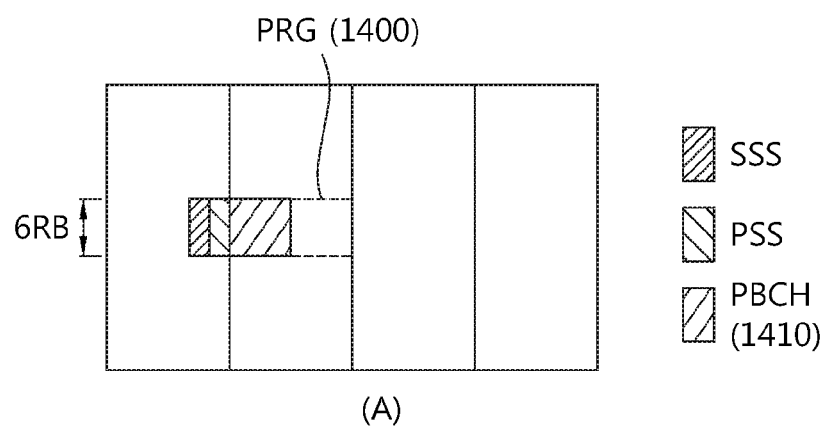
(A)
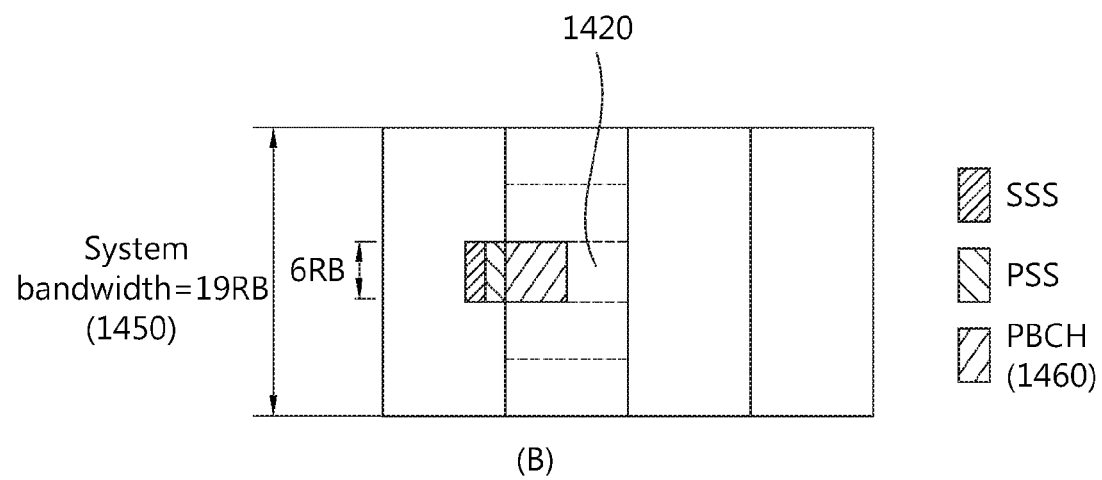
(B)

FIG. 16

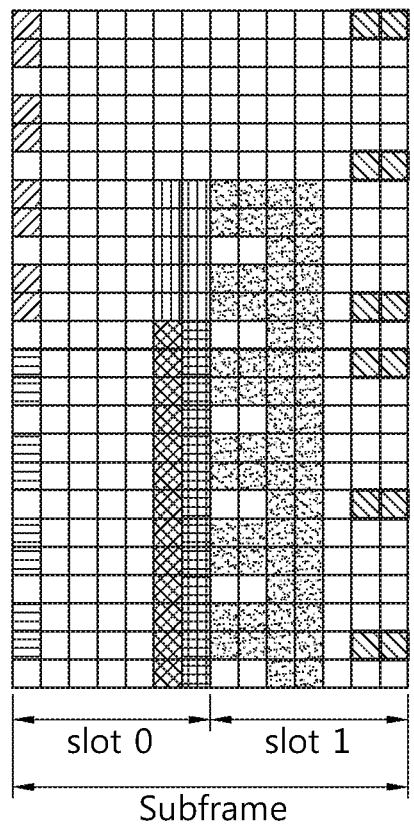

slot 0 | slot 1

Subframe

▦ PSCH (Primary Synchronization Channel)
▨ SSCH (Secondary Synchronization Channel)
▥ PBCH (Physical Broadcast Channel)
▥ CRS for selected Tx antenna port 1 (1520)
▨ PHICH (Physical Hybrid ARQ (Automatic Repeat reQuest) Indicator Channel)
▤ PDCCH (Physical Downlink Control Channel)
☐ Available for PDSCH (Physical Downlink Shared Channel)
▨ URS (UE-specific RS)

METHOD AND APPARATUS FOR TRANSMITTING REFERENCE SIGNAL

CROSS-REFERENCE TO RELATED APPLICATIONS

This application is a continuation of application Ser. No. 14/384,574, filed on Sep. 11, 2014, now U.S. Pat. No. 9,602,258, which is the National Stage filing under 35 U.S.C. 371 of International Application No. PCT/KR2013/002458, filed on Mar. 25, 2013, which claims the benefit of U.S. Provisional Application No. 61/614,540, filed on Mar. 23, 2012, the contents of which are all hereby incorporated by reference herein in their entireties.

FIELD OF THE INVENTION

The present invention relates to wireless communication, and more particularly, to a method and an apparatus for transmitting a reference signal.

RELATED ART

Intensive research is conducted in order to improve performance in terms of a capacity, transmission coverage, coordination between cells, and cost. Introduction of various technologies including small cell enhancement, macro cell enhancement, a new carrier type, machine type communication, and the like as a technological term in LTE release 12 for the performance improvement.

Enhancement of the capacity and the transmission coverage targeted by the LTE release 12 may be achieved by small cell enhancement based on inter-site carrier aggregation and inter-LTE-wireless local area network (WLAN) integration and the macro cell enhancement. As the size of the cell decreases, inter-cell movement of a UE frequently occurs, and as a result, the quantity of traffics signaled when the UE moves may increase. In order to solve the problem, signaling transmitted to a core network in a radio access network (RAN) is decreased by using the small cell enhancement to optimize a small cell.

The new carrier type (NCT) is a frame type which is newly defined differently from a legacy frame configuration. The NCT may be a carrier type optimized to the small cell, but may be applied to even the macro cell. The NCT may decrease overhead which occurs by transmitting a cell-specific reference signal (CRS) and demodulate a downlink control channel based on a demodulation reference signal (DM-RS). Energy of a base station may be saved and interference which occurs in a heterogeneous network (Het-Net) by newly defining the NCT. Further, reference signal overhead which occurs at the time of transmitting data may be decreased by using the NCT. In more detail, the NCT maintains the existing frame structure (e.g., CP length, subframe structure, and duplex mode), but may be defined by a carrier which is different in a structure of an actually transmitted reference signal and is not backward compatible (to el-11 and below UEs).

SUMMARY OF THE INVENTION

An aspect of the present invention provides a method for transmitting a reference signal.

Another aspect of the present invention provides an apparatus for performing the method for transmitting a reference signal.

An exemplary embodiment of the present invention provides a method for transmitting a reference signal including: transmitting a secondary synchronization signal (SSS) and a primary synchronization signal (PSS) in a subframe including N (a natural number of N>1) resource blocks (RBs) and a plurality of orthogonal frequency division multiplexing (OFDM) symbols; and transmitting a reference signal created based on a cell identifier in the subframe, in which the PSS is transmitted in K (a natural number of K<N) contiguous RBs selected from a plurality of RBs in a sixth OFDM symbol of the subframe, the SSS is transmitted in K (a natural number of K<N) contiguous RBs selected from the plurality of RBs in a seventh OFDM symbol of the subframe, the reference signal is transmitted in M (a natural number of K<=M<N) RBs including the K RBs in the remaining OFDM symbols except for the sixth OFDM symbol and the seventh OFDM symbol, when N is an even number, M is an even number, and when N is an odd number, M is an odd number.

Another exemplary embodiment of the present invention provides a base station including a processor, in which the processor is implemented to transmit a secondary synchronization signal (SSS) and a primary synchronization signal (PSS) in a subframe including N (a natural number of N>1) resource blocks (RBs) and a plurality of orthogonal frequency division multiplexing (OFDM) symbols and transmit a reference signal created based on a cell identifier in the subframe, the PSS is transmitted in K (a natural number of K<N) contiguous RBs selected from a plurality of RBs in a sixth OFDM symbol of the subframe, the SSS is transmitted in K (a natural number of K<N) contiguous RBs selected from the plurality of RBs in a seventh OFDM symbol of the subframe, the reference signal is transmitted in M (a natural number of K<=M<N) RBs including the K RBs in the remaining OFDM symbols except for the sixth OFDM symbol and the seventh OFDM symbol, when N is an even number, the M is an even number, and when N is an odd number, the M is an odd number.

It is possible to enhance demodulation performance of the UE.

BRIEF DESCRIPTION OF THE DRAWINGS

FIG. 7 is a schematic diagram illustrating a method for transmitting a CRS through an NCT subframe by a base station according to the exemplary embodiment of the present invention.

FIG. 8 is a schematic diagram illustrating a method for transmitting a CRS through an NCT subframe by a base station according to the exemplary embodiment of the present invention.

FIG. 12 is a schematic diagram illustrating a method for transmitting a time/frequency tracking CRS by using a plurality of antenna ports in the base station according to an exemplary embodiment of the present invention.

FIG. 13 is a schematic diagram illustrating a method for transmitting a time/frequency CRS using a plurality of antennas according to an embodiment of the present invention.

FIG. 14 is a schematic diagram illustrating a PRB bundling method according to the exemplary embodiment of the present invention.

FIG. 16 is a schematic diagram illustrating a method for transmitting a URS in the NCT subframe according to the exemplary embodiment of the present invention.

DESCRIPTION OF EXEMPLARY EMBODIMENTS

A wireless device may be fixed or movable and may be called other terms such as user equipment (UE), a mobile station (MS), a mobile terminal (MT), a user terminal (UT), a subscriber station (SS), a personal digital assistant (PDA), a wireless modem, a handheld device, and the like. Alternatively, the wireless device may be a device that supports only data communication, such as a machine-type communication (MTC) device.

A base station (BS) generally represents a fixed station that communicates with the wireless device, and may be called different terms such as an evolved-NodeB (eNB), a base transceiver system (BTS), an access point, and the like.

Hereinafter, it is described that the present invention is applied based on 3rd Generation Partnership Project (3GPP) long term evolution (LTE) based on 3GPP technical specification (TS) release 8 or 3GPP LTE-A based on 3GPP TS release 10. This is just an example and the present invention may be applied to various wireless communication networks. Hereinafter, LTE includes LTE and/or LTE-A.

Figure 1:
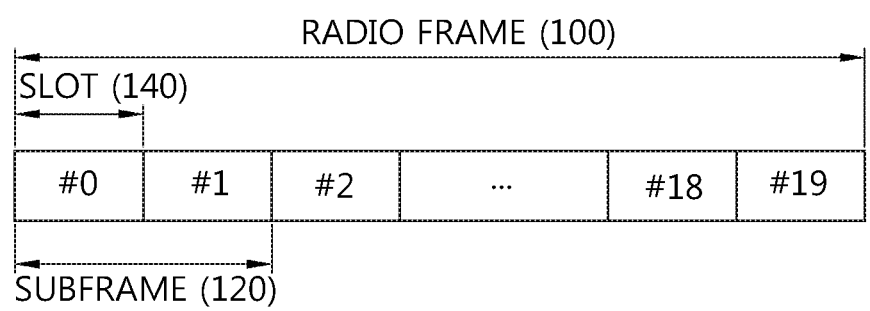
FIG. 1 illustrates the structure of a radio frame in 3rd Generation Partnership Project (3GPP) long term evolution (LTE).

FIG. 1 illustrates the structure of a radio frame in 3rd Generation Partnership Project (3GPP) long term evolution (LTE).

The structure of the radio frame 10 in the 3GPP LTE may refer to Clause 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame 100 is constituted by 10 subframes, and one subframe 120 is constituted by two slots 140. In the radio frame 100, an index may be applied according to the slot 140 of slots #0 to #19 or the index may be applied according to the subframe 120 of subframes #0 to 9. Subframe #0 may include slot #0 and slot #1.

A time required to transmit one subframe 120 is referred to as a transmission time interval (TTI). The TTI may be a scheduling unit for data transmission. For example, the length of one radio subframe 100 may be 10 ms, the length of one subframe 120 may be 1 ms, and the length of one slot 140 may be 0.5 ms.

One slot 140 includes a plurality of orthogonal frequency division multiplexing (OFDM) symbols in a time domain, and a plurality of subcarriers in a frequency domain. Since the 3GPP LTE uses the OFDMA in the downlink, the OFDM symbol is used to express one symbol period and may be called other name according to a multiple access scheme. For example, when a single carrier-frequency division multiple access (SC-FDMA) is used as an uplink multiple access scheme, the OFDM symbol may be called an SC-FDMA symbol. A resource block (RB) includes a plurality of contiguous subcarriers in one slot as a resource allocation unit. The resource block will be disclosed in detail in FIG. 2. The structure of the radio frame 100 disclosed in FIG. 1 is one embodiment for a frame structure. Accordingly, the number of subframes 120 included in the radio frame 100, the number of slots 140 included in the subframe 120, or the number of OFDM symbols included in the slot 140 is variously changed to be defined as a new radio frame format.

The 3GPP LTE defines that one slot includes 7 OFDM symbols when a normal cyclic prefix (CP) is used, and one slot includes 7 OFDM symbols when an extended CP is used.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be advantageously acquired from the uplink channel response. In the TDD scheme, since all the frequency bands are time-divided into the uplink transmission and the downlink transmission, the downlink transmission by the base station and the uplink transmission by the UE may not simultaneously be performed. In the TDD system in which the uplink transmission and the downlink transmission are divided by the unit of the subframe, the uplink transmission and the downlink transmission are performed in different subframes.

Figure 2:
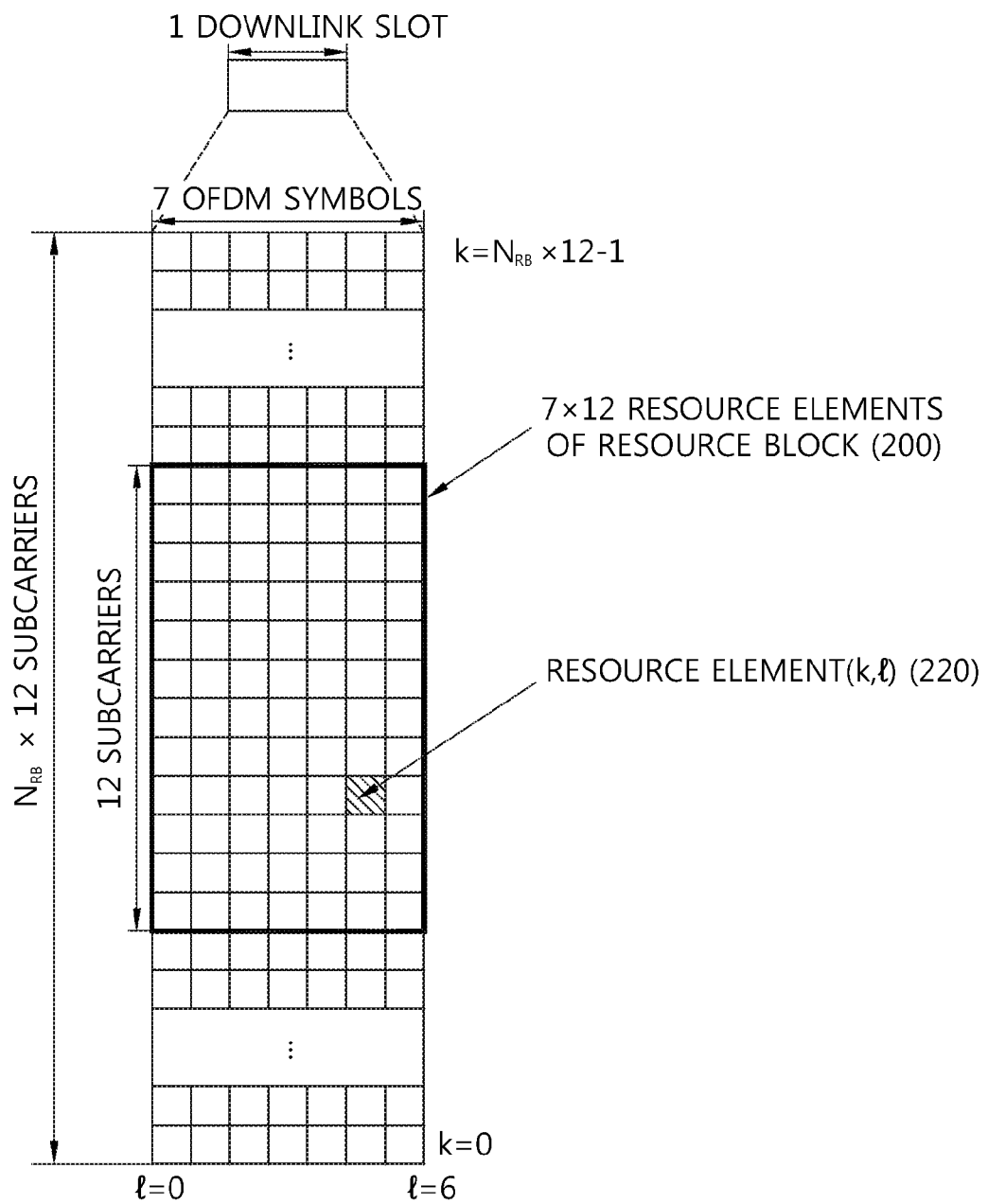
FIG. 2 illustrates one example of a resource grid for a downlink slot.

FIG. 2 illustrates one example of a resource grid for a downlink slot.

The downlink slot includes a plurality of OFDM symbols in the time domain, and includes NRB resource blocks in the frequency domain. NRB which is the number of resource blocks included in the downlink slot is subordinate to a downlink transmission bandwidth set in a cell. For example, in an LTE system, the NRB may be any one of 6 to 110 according to the used transmission bandwidth. One resource block 200 includes a plurality of subcarriers in the frequency domain. The structure of an uplink slot may also be the same as that of the downlink slot.

Each element on the resource grid is called a resource element 220. The resource element 220 on the resource grid may be identified by a pair of indexes (k,l) in the slot. Herein, k (k=NRB×12-1) represents a subcarrier index in the frequency domain, and l (l=0, . . . , 6) represents an OFDM symbol index in the time domain.

Herein, it is exemplified that one resource block 200 is 7×12 resource elements 220 which are constituted by 7 OFDM symbols in the time domain and 12 subcarriers in the frequency domain, but the number of the OFDM symbols and the number of the subcarriers in the resource block 220 are not limited thereto. The number of the OFDM symbols and the number of the subcarriers may be variously changed depending on the length of the CP, frequency spacing, and the like. For example, in the case of a normal CP, the number of OFDM symbols is 7 and in the case of an extended CP, the number of OFDM symbols is 6. As the number of subcarriers in one OFDM symbol, one of 128, 256, 512, 1024, 1536, and 2048 may be selected and used.

Figure 3:
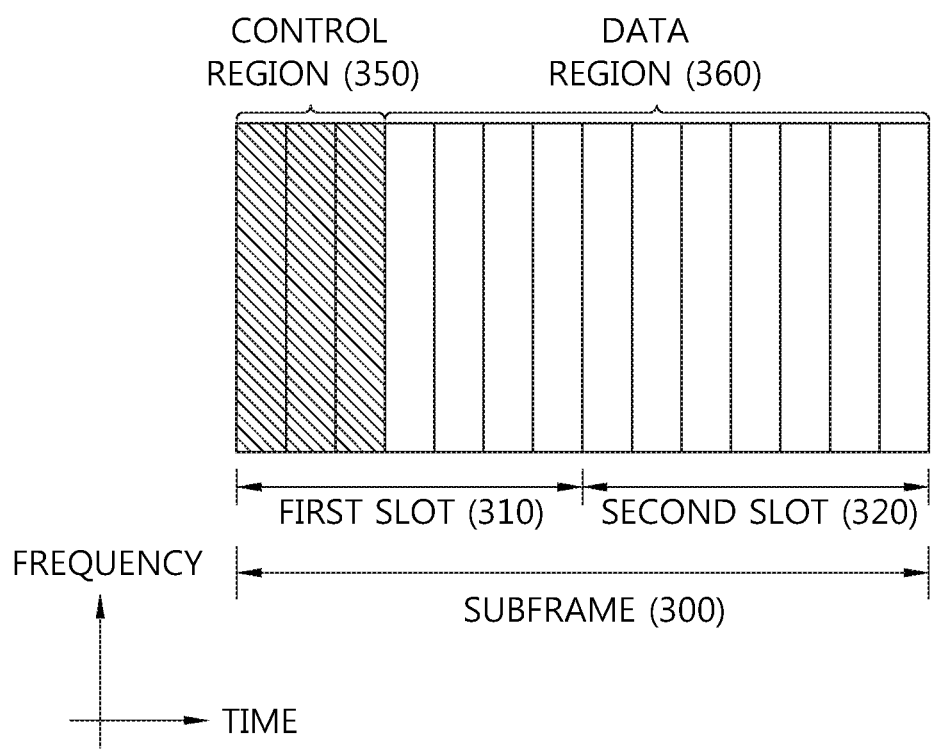
FIG. 3 illustrates the structure of a downlink subframe.

FIG. 3 illustrates the structure of a downlink subframe.

The downlink subframe 300 includes two slots 310 and 320 in the time domain and each of the slots 310 and 320 includes 7 OFDM symbols in the normal CP. Preceding maximum 3 OFDM symbols (maximum 4 OFDM symbols for a 1.4 Mhz bandwidth) of a first slot 310 in the subframe 300 are a control region 350 to which control channels are allocated, and residual OFDM symbols become a data region 360 to which a physical downlink shared channel (PDSCH) is allocated.

A PDCCH may carry resource allocation and a transmission format of a downlink-shared channel (DL-SCH), resource allocation information of an uplink shared channel (UL-SCH), paging information on a PCH, system information on the DL-SCH, resource allocation of an upper layer control message such as a random access response transmitted on the PDSCH, a set of transmission power control commands for individual UEs in a predetermined UE group, and activation of voice over Internet protocol (VoIP). A plurality of PDCCH regions may be transmitted in the control region 350, and the UE may monitor the plurality of PDCCHs. The PDCCH is transmitted on aggregation of one or several contiguous control channel elements (CCEs). The CCE is a logical allocation unit used to provide to the coding rate to the PDCCH depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines the PDCCH format according to the downlink control information (DCI) to be sent to the UE and affixes a cyclic redundancy check (CRC) to the control information. A unique identifier (radio network temporary identifier (RNTI)) is masked on the CRC according to an owner or a purpose of the PDCCH. In the case of a PDCCH for a specific UE, a unique identifier of the UE, for example, a cell (C)-RNTI may be masked on the CRC. Alternatively, in the case of a PDCCH for a paging message, a paging indication identifier, for example, a paging (P)-RNTI may be masked on the CRC. In the case of a PDCCH for a system information block (SIB), a system information (SI)-RNTI may be masked on the CRC. A random access (RA)-RNTI may be masked on the CRC in order to indicate the random access response which is a response to transmission of a random access preamble of the UE.

Figure 4:
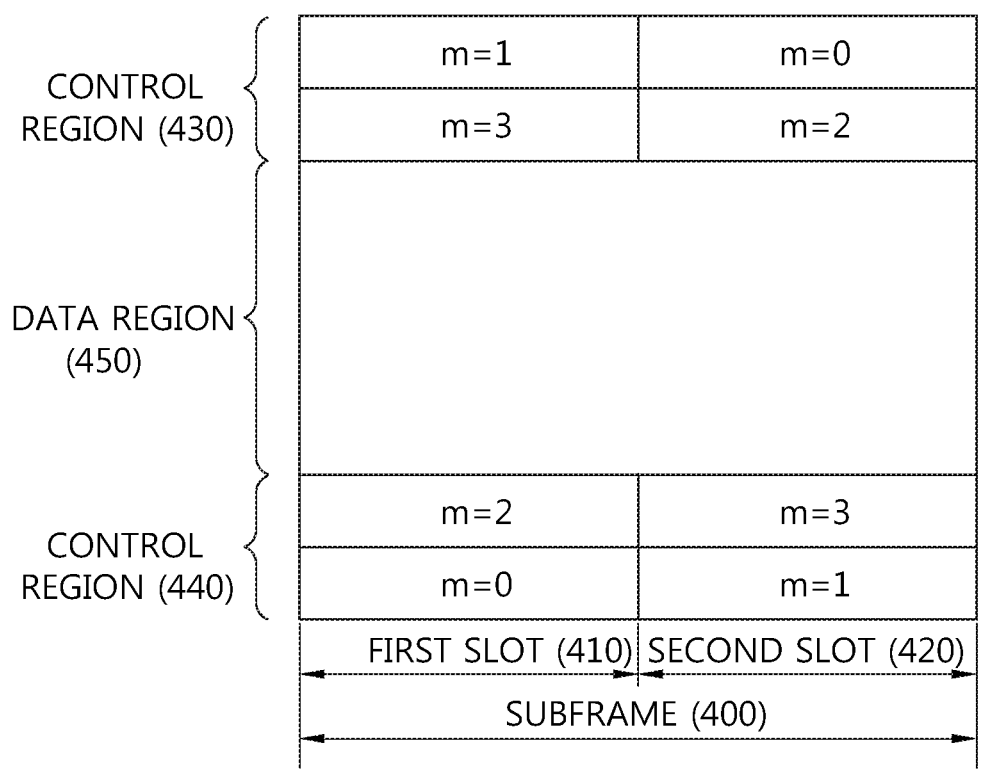
FIG. 4 illustrates a structure of an uplink subframe.

FIG. 4 shows a structure of an uplink subframe.

The uplink subframe may be divided into control regions 430 and 440 and a data region 450 in the frequency domain. A physical uplink control channel (PUCCH) for transmitting the uplink control information is allocated to the control regions 430 and 440. A physical uplink shared channel (PUSCH) for transmitting data is allocated to the data region 450. When indicated in a higher layer, the UE may support simultaneous transmission of the PUSCH and the PUCCH.

A PUCCH for one UE is allocated to a resource block (RB) pair in the subframe 400. Resource blocks that belong to the RB pair occupy different subcarriers in first and second slots 410 and 420, respectively. A frequency occupied by the resource blocks that belongs to the RB pair allocated to the PUCCH is changed based on a slot boundary. This means that the RB pair allocated to the PUCCH is frequency-hopped on the slot boundary. The UE transmits the uplink control information through different subcarriers with time to acquire a frequency diversity gain. m is a position index representing a logical frequency domain position of the resource block pair allocated to the PUCCH in the subframe.

The uplink control information transmitted on the PUCCH includes a hybrid automatic repeat request (HARQ) acknowledgement (ACK)/non-acknowledgement (NACK), a channel quality indicator (CQI) indicating a downlink channel status, a scheduling request (SR) which is an uplink radio resource allocation request, and the like.

The PUSCH is mapped in the uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the control information. For example, the control information multiplexed to the data may include a CQI, a precoding matrix indicator (PMI), HARQ, a rank indicator (RI), and the like. Alternatively, the uplink data may be constituted by only the control information.

Figure 5:
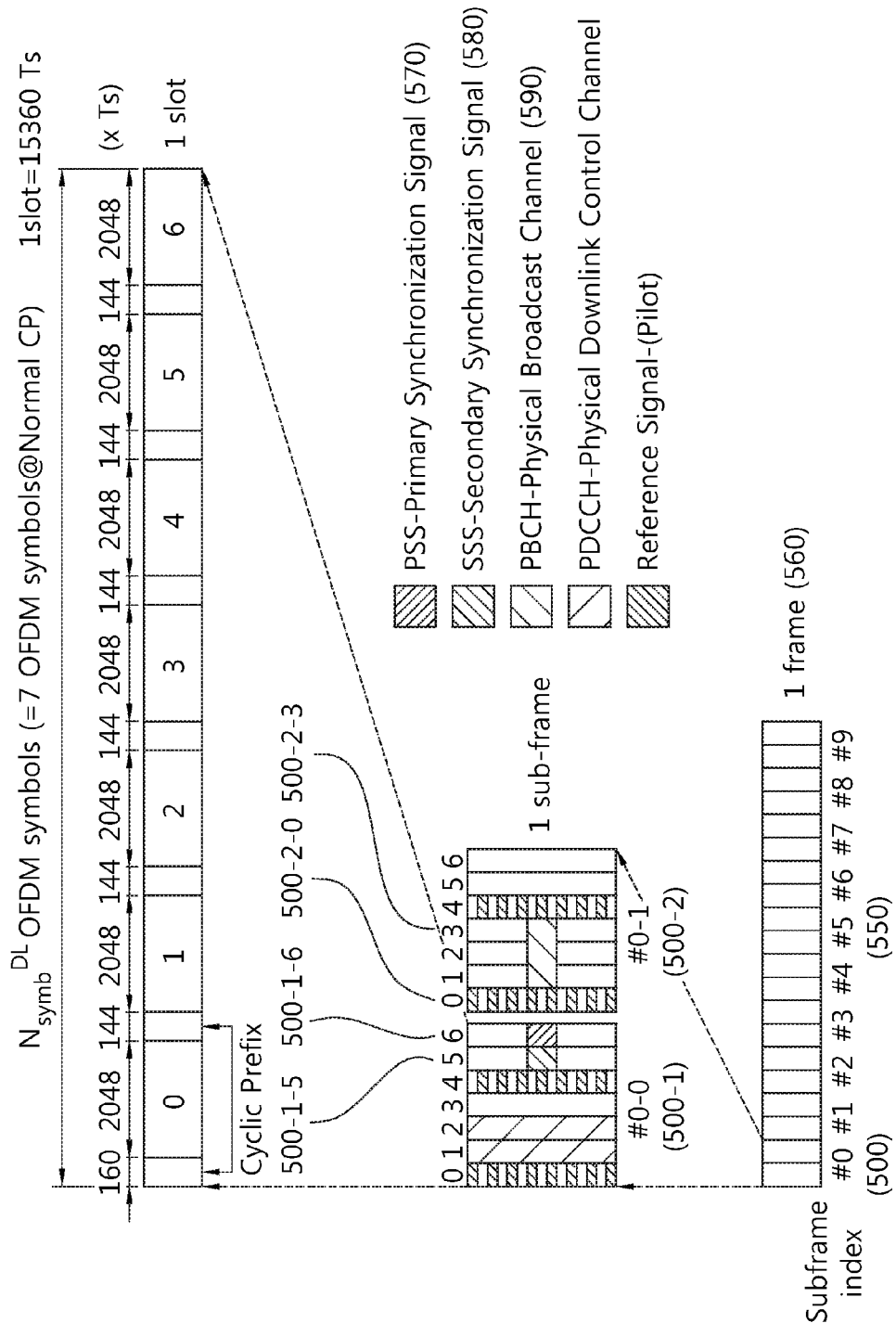
FIG. 5 is a schematic diagram illustrating a subframe structure.

FIG. 5 is a schematic diagram illustrating a subframe structure.

FIG. 5 illustrates a frame using a normal cyclic prefix (CP) in an LTE system using frequency division duplex (FDD) as a duplexing method. One frame may include 10 subframes (subframe #0 to subframe #9). One subframe corresponds to 1 ms on a time axis, and a frame which is a set of 10 subframes corresponds 10 ms on a time axis. One subframe may be divided into two slots (a slot is 0.5 ms). One slot corresponds to 7 OFDM symbols on the time axis.

The base station may transmit physical broadcast channel (PBCH) data in a second slot 500-2 of subframe #0 500 which is a first subframe included in the frame. The base station may transmit a secondary synchronization signal (SSS) 580 through OFDM symbols #5 500-1 to 500-5 of the first slot 500-1 of the subframe #0 500. Further, the base station may transmit a primary synchronization signal (PSS) 570 through OFDM symbols #6 500-1 to 500-6. The base station may transmit the SSS 580 and the PSS 570 like the first slot 500-1 of the subframe #0 500 even in the first slot of the subframe #5 550 corresponding to a half-frame included in the frame. The base station may transmit the PSS 570 and the SSS 580 in a frequency band corresponding to 6 RBs (72 subframes except for a DC subcarrier) based on a center frequency.

The PBCH data 590 may include a master information block (MIB). The MIB may include information such as information on a downlink cell bandwidth and system frame numbers. The PBCH data 590 is transmitted for every 40 ms. The base station may transmit the PBCH data to the UE through four OFDM symbols (OFDM symbols #0 500-2 and 500-0 to OFDM symbols #3 500-2 and 500-3) on the time axis and 6 RBs (72 subcarriers except for the DC subcarrier)

based on the center frequency on a frequency axis. The PSS 570 and the SSS 580 are illustrated in more detail in FIG. 6.

Figure 6:
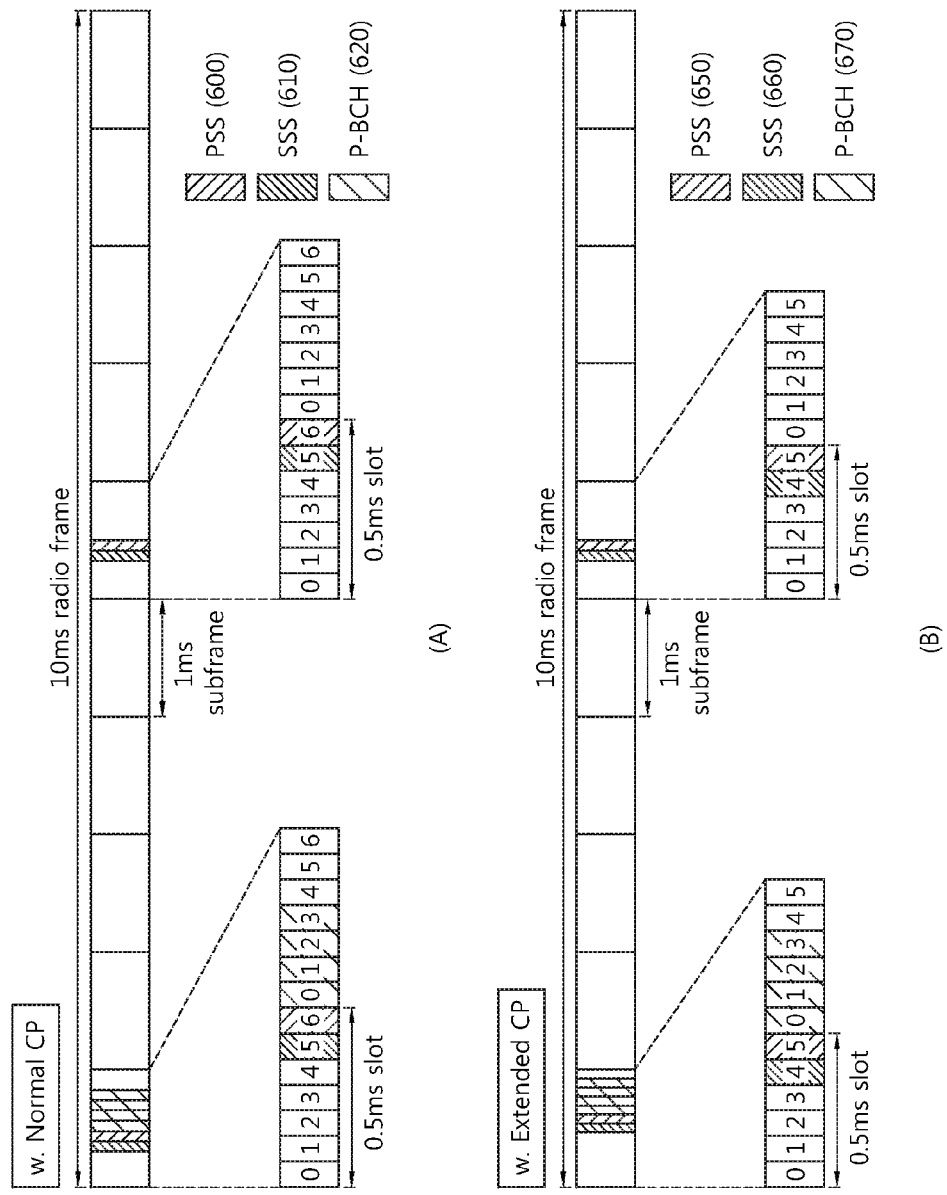
FIG. 6 is a conceptual diagram illustrating a frame where a PSS and an SSS are transmitted according to the exemplary embodiment of the present invention.

FIG. 6 is a schematic diagram illustrating a frame where the PSS and the SSS are transmitted according to the exemplary embodiment of the present invention.

FIG. 6A illustrates a frame using a normal CP, and FIG. 6B illustrates a frame using an extended CP.

The base station may transmit a synchronization signal (SS) through the second slot of the subframe #0 and the subframe #5 as described above in FIG. 5 even though considering 4.6 ms which is a global system for mobile communication (GSM) frame length for easiness of inter-radio access technology (RAT) measurement between RATs.

SSSs 610 and 660 detect a cell identity group and may be used for frame boundary detection. PSSs 600 and 650 detect one cell of cells included in the cell ID group indicated through the SSSs 610 and 660, and may be used for half frame detection.

The base station may transmit the PSSs 600 and 650 through the last OFDM symbol of the slot transmitted with the PSSs 600 and 650. Further, the base station transmits the SSSs 610 and 660 through the previous OFDM symbol of the OFDM symbol where the PSSs 600 and 650 are transmitted. The SS may transmit information on the cell ID transmitted in a current frame among a total of 504 physical cell IDs by combining three PSSs 600 and 650 and 168 SSSs 610 and 660. Further, the base station the SS and the PBCH data through the frequency band of the center 6 RBs based on the center frequency in the system bandwidth. By using the method, even though the entire system bandwidth is changed, the UE receives the SS and the PBCH data 620 and 670 to receive the synchronization and system information.

In a LTE release 8/9/10 system, the base station may transmit reference signals (RSs) and data such as the cell-specific RS (CRS), the PSS/SSS, the PDCCH data, and the PBCH data.

In a next-generation system after the LTE Release 8/9/10 system, a new carrier type (NCT) subframe or an extension carrier subframe are defined to transmit and receive downlink data and uplink data through a newly defined subframe. The NCT subframe may be a carrier type optimized and implemented in a small cell unit such as a small cell or a micro cell. The NCT subframe may reduce overhead due to a reference signal which is a problem in an existing legacy subframe.

The NCT subframe may be a subframe in which all or some of signals transmitted in the existing system and information transmitted through a channel, and interference between the plurality of cells may be prevented and extension of the carrier may be improved.

The base station may transmit the CRS to the UE through the NCT subframe. The UE may perform time/frequency tracking for the receiving signal based on the CRS transmitted through the NCT subframe.

FIG. 7 is a schematic diagram illustrating a method for transmitting a CRS through the NCT subframe in the base station according to the exemplary embodiment of the present invention.

Referring to FIG. 7, the base station may transmit the CRS through the entire system bandwidth or some frequency bandwidths of the entire system bandwidth. A frequency bandwidth at which the CRS is transmitted in the NCT subframe may vary according to whether the system bandwidth is the frequency bandwidth corresponding to even RBs or the frequency bandwidth corresponding to odd RBs.

Here, in the exemplary embodiment of the present invention, it is assumed that one RB corresponds to 12 subcarriers (for example, one subcarrier has a size of the frequency bandwidth of 15 kHz) on a frequency axis and 7 OFDM symbols on a time axis. The size of the resource on the frequency axis/time axis configuring the RB may be changed, and the method for transmitting the CRS illustrated in the exemplary embodiment of the present invention may be applied to the RB having the area of the resource on the different frequency axis/time axis.

FIG. 7A illustrates a frequency band where the CRS is transmitted by the base station in the case where the entire system bandwidth is the frequency bandwidth corresponding to the even RBs.

Referring to FIG. 7A, the entire system bandwidth may be a frequency bandwidth of 12 RBs having indexes 0 to 11.

In the case where the entire system bandwidth is the frequency bandwidth corresponding to the even RBs, the base station may transmit the CRS in the frequency bandwidth of the center 6 RBs which are positioned at the center of the entire system bandwidth. In FIG. 7A, the base station may transmit the CRS in the frequency band corresponding to three RBs in a direction where the frequency is increased based on the center frequency and the frequency band (RB index 3 700-3 to RB index 8 700-8) corresponding to three RBs in a direction where the frequency is decreased based on the center frequency.

When the frequency band of one RB is a frequency band corresponding to 12 contiguous subcarriers, the base station may transmit the CRS to the UE in the area of the frequency band corresponding to 72 subcarriers except for the DC subcarrier corresponding to the center frequency.

FIG. 7B illustrates a case where the entire system bandwidth is a frequency bandwidth of odd RBs and the CRS is transmitted in the frequency band of even RBs.

In FIG. 7B, it is assumed that the entire system bandwidth is the frequency bandwidth of 15 RBs including the RBs having indexes of 0 to 14. In the case where the base station transmits the CRS in the area corresponding to the center 6 RBs, the base station may transmit the CRS in the area corresponding to 6 RBs based on the center frequency. When the entire frequency bandwidth is an odd number, the frequency band in which the base station transmits the CRS dose not coincide with the boundary of the RBs. In the RBs positioned at both ends based on the center frequency among the RBs transmitting the CRS, the CRS may be configured only in the area corresponding to 6 subcarriers corresponding to ½ RB in the frequency band.

In the method for transmitting the CRS according to the exemplary embodiment of the present invention, the base station transmits the CRS in x RBs (x is an integer of 6 or more and an even number) positioned at the center based on the center frequency, the area where the CRS is transmitted may vary as follows.

1) In the case where the system bandwidth is a frequency band corresponding to even RBs and the frequency band where the CRS is transmitted is x RBs (x is an even number), the base station may transmit the CRS in the frequency band of x RBs positioned at the center in the entire system bandwidth based on the center frequency. In this case, the frequency band where the CRS is transmitted coincides with the boundary of the RB.

2) In the case where the system bandwidth is a frequency band corresponding to odd RBs and the frequency band where the CRS is transmitted is x RBs (x is an even number), the frequency band where the CRS is transmitted may be a frequency band of (x−1) RBs positioned at the center in the entire system bandwidth based on the center frequency, a frequency band of ½ RB in a direction where the frequency is increased in the frequency band of (x−1) RBs, and a frequency band of ½ RB in a direction where the frequency is decreased in the frequency band of (x−1) RBs. That is, the boundary of the frequency band where the CRS is transmitted does not coincide with the boundary of the RB.

FIGS. 7A and 7B illustrate a case where the frequency band of the entire system bandwidth is even RBs or odd RBs and a case where the frequency band where the CRS is transmitted is even RBs.

Unlike FIGS. 7A and 7B, when the frequency band where the CRS is transmitted is odd RBs, the method for transmitting the CRS described in FIGS. 7A and 7B may vary.

That is, unlike FIG. 7, when the entire system bandwidth is the frequency band of odd RBs, the base station may transmit the CRS in accordance with the boundary of the RB. When the entire system bandwidth is the frequency band of even RBs, the RBs at both ends of the RBs transmitting the CRS may be the RBs transmitting the CRS only in the frequency band corresponding to ½ RB.

FIG. 8 is a schematic diagram illustrating a method for transmitting the CRS through the NCT subframe by the base station according to the exemplary embodiment of the present invention.

FIG. 8A illustrates a case where the entire system bandwidth is even RBs and the base station transmits the CRS through the frequency band of odd RBs.

In FIG. 8A, it is assumed that the system bandwidth is a frequency bandwidth corresponding to 12 RBs of indexes 0 to 11 and the base station transmits the CRS in the frequency band of center 5 RBs. The CRS may be transmitted in the frequency band corresponding to RB#4 800-4 to RB#7 800-7 based on the center frequency, the frequency band corresponding to 6 subcarriers corresponding to a half of the frequency band of RB#3 800-3, and a frequency band corresponding to 6 subcarriers corresponding to a half of the frequency band of RB#8 800-8.

That is, the UE may receive the CRS in the frequency band corresponding to 6 subcarriers which is close to the center frequency in four RBs RB#4 800-4 to RB#7 800-7, the RB#3 800-3, and the RB#8 800-8. When the entire system bandwidth is even RBs and the CRS is transmitted in odd RBs, the boundary of the RB and the boundary of the frequency band where the CRS is transmitted do not coincide with each other.

FIG. 8B is a schematic diagram illustrating a case where the entire system bandwidth is odd RBs and the CRS is transmitted in odd RBs.

Referring to FIG. 8B, the system bandwidth may have a frequency bandwidth of 13 RBs of indexes 0 to 12. In this case, the frequency band of 5 RBs where the CRS is transmitted may be 5 RBs RB#4 850-4 to RB #8 850-8 based on the center frequency. When the entire system bandwidth is odd RBs and the CRS is transmitted in odd RBs, the boundary of the RB and the boundary of the frequency band where the CRS is transmitted coincide with each other.

The UE may perform coherent demodulation of data without performing non-code book based beamforming in the base station, among the data received through the downlink channel based on the received CRS. Further, the UE may perform initial cell searching and scheduling, and intensity measurement of the downlink signal for handover based on the CRS.

Further, the UE may demodulate the data which performs the non-code book based beamforming in the base station, among the data received through the downlink channel based on the received URS. The URS may be included only in the RBs allocated as the PDSCH resource for decoding the PDSCH data which are transmitted only to the specific UE to be transmitted. The URS may be a reference signal created base on the UE identifier.

In the first subframe, a resource area where the URS is transmitted and a resource area where the PBCH data is transmitted, or a resource area where the PSS/SSS is transmitted may be duplicated. When the resources are duplicated, the base station transmits the PBCH data or the PSS/SSS to the UE, and the URS is not transmitted. When the base station does not transmit the URS, the UE may demodulate the PBCH data or PDSCH data included in the RBs transmitting the PSS/SSS based on the CRS received through the corresponding to the RB instead of the URS.

A minimum allocation unit of the resource transmitting the PDSCH data is the RB. In the NCT subframe, the frequency bandwidth where the CRS is transmitted may be limited. As illustrated in FIGS. 7 and 8, when the frequency bandwidth where the CRS is transmitted is limited in the NCT subframe, the base station may transmit the specific RB and the CRS only through some subcarriers in the frequency band, not the entire frequency band of the RBs.

That is, in the frequency band where the boundary of the RB and the frequency bandwidth where the CRS is transmitted do not coincide with each other and the CRS is not received, the channel estimation performance using the CRS deteriorates and the demodulation performance of the PDSCH data of the UE may deteriorate. Hereinafter, in the exemplary embodiment of the present invention, a method for transmitting the CRS without deteriorating the demodulation performance of the PDSCH data will be illustrated.

Figure 9:
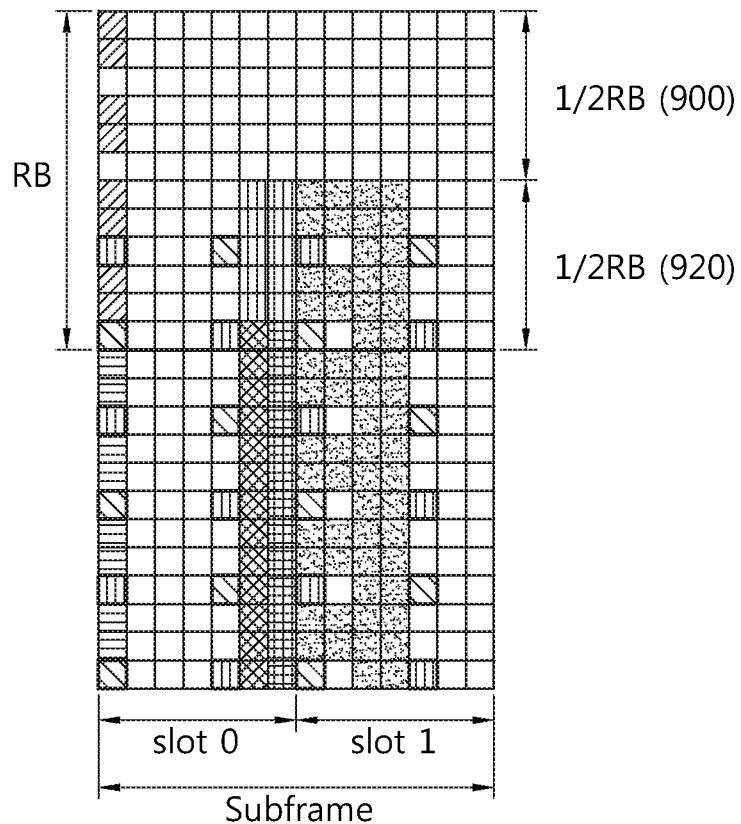
FIG. 9 is a schematic diagram illustrating a resource area where a base station transmits a CRS according to the exemplary embodiment of the present invention.

FIG. 9 is a schematic diagram illustrating a resource area where the base station transmits the CRS according to the exemplary embodiment of the present invention.

In FIG. 9, it is assumed that when the system bandwidth is a frequency bandwidth of odd RBs and the base station transmits the CRS in the frequency bandwidth of x RBs (x is an even number, for example, 6 RBs), the frequency bandwidth where the CRS is transmitted and the boundary of the RB do not coincide with each other.

Referring to FIG. 9, the base station transmits a CRS 950 only in a first frequency band 920 of ½ RB corresponding to 6 subcarriers in the frequency band of the RB. The base station does not transmit the CRS 950 in a second frequency band 900 of ½ RB corresponding to the remaining 6 subcarriers. The UE may not use the CRS 950 received through the second frequency band 900 of ½ RB in order to demodulate the PDSCH data transmitted through the second frequency band 900 of ½ RB. Accordingly, the demodulation performance of the PDSCH data of the UE may deteriorate.

In the exemplary embodiment of the present invention, in order to prevent the deterioration of the performance of the PDSCH, when the frequency band where the CRS is transmitted and the boundary of the RB do not coincide with each other, the base station may transmit the CRS to the UE through an additional frequency bandwidth so that the frequency band where the CRS is transmitted and the boundary of the RB coincide with each other.

In the PBCH data area illustrated in FIG. 9 and the exemplary embodiment of the present invention below, it is assumed that a cell transmitting the NCT subframe is a primary cell (PCell) during carrier aggregation. In the case where the NCT subframe is a subframe transmitted in a secondary cell (SCell), the PBCH may not be transmitted. In the NCT subframe, the system information may be transmitted through a new control channel.

Figure 10:
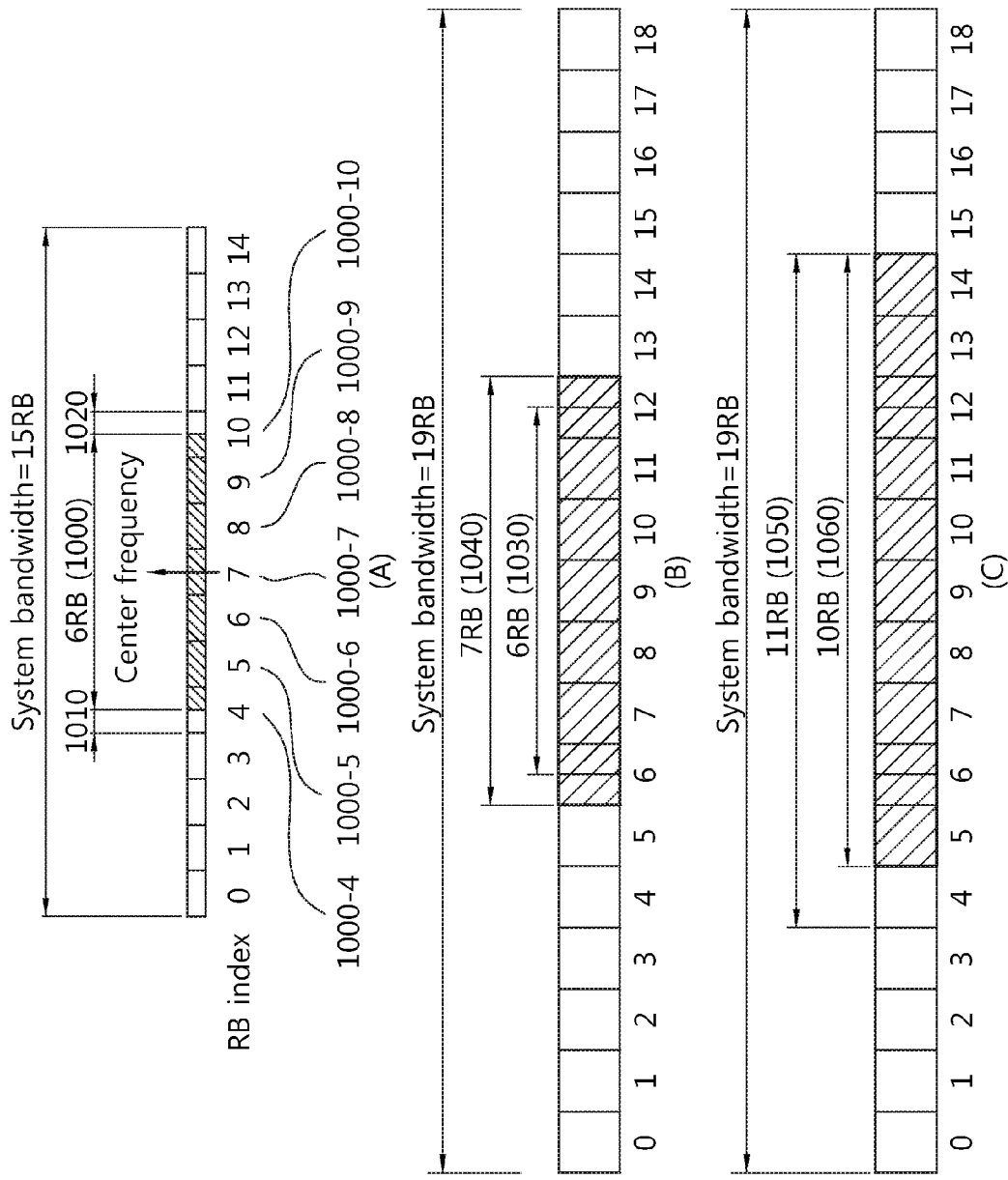
FIG. 10 is a schematic diagram illustrating a method for transmitting a CRS according to the exemplary embodiment of the present invention.

FIG. 10 is a schematic diagram illustrating a method for transmitting a CRS according to the exemplary embodiment of the present invention.

As illustrated in FIG. 10A, the frequency band configured to transmit the CRS and the boundary of the RB may not coincide with each other. The frequency band configured to transmit the CRS is called a CRS frequency band.

When the frequency band configured to transmit the CRS and the boundary of the RB do not coincide with each other, the base station may additionally the CRS to the UE even in a frequency band of ½ RB configured to transmit the CRS in the RBs corresponding to the two-end frequency bands and a frequency band corresponding to the remaining ½ RB 1010 and 1020. That is, the base station may transmit the CRS in a frequency band which is extended as compared with a configured CRS frequency band configured to transmit the CRS. The frequency band which is extended as compared with the frequency band configured to transmit the CRS is called an extended CRS frequency band. The UE demodulates the PDSCH data received through the extended CRS frequency band based on the CRS received through the extended CRS frequency band to improve the demodulation performance.

As illustrated in FIG. 10A, a frequency band 1010 corresponding to ½ RB of RB#4 100-4 and a frequency band 1020 corresponding to ½ RB of RB#10 1000-10 may be extended CRS frequency bands.

Hereinafter, FIGS. 10B and 10C illustrate a method of determining an extended CRS frequency band in the case where the system bandwidth is a frequency bandwidth of N RBs and the configured CRS frequency band is x.

FIG. 10B illustrates a case where the system frequency band is a frequency band of N RBs (N is a natural number) and the base station transmits the CRS in the frequency band of center x RBs (N>=x, x: natural number). When a value of N mod 2 and a value of x mod 2 are not the same as each other, the base station may transmit the CRS in the entire frequency band corresponding to the frequency bands of center (x+1) RBs. That is, it is possible to enhance the demodulation performance of the PDSCH data received in the extended CRS frequency band by configuring the frequency band where the CRS is transmitted only in ½ RB to the extended CRS frequency band so as to be transmitted in the entire frequency band of the RBs. Here, mod means a modulo operation.

Like FIG. 10(B), when N is 19 and x is 6 (1030), 19 mod 2 has a value of 1 and 6 mod 2 is 0, which are different values. In this case, the base station may transmit the CRS in the frequency band of 7 (which is x+1) RBs 1040. The UE may enhance the demodulation performance of the PDSCH data received through the extended CRS frequency band based on the CRS additionally transmitted by the base station.

Further, when the values of N mod 2 and x mod 2 are the same as each other, an area where the CRS is transmitted only in the ½ RB does not exist. That is, since the frequency band where the base station transmits the CRS only in the frequency band of some of RBs does not exist, the base station needs not to separately configure the extended CRS frequency band to transmit the CRS. Accordingly, the base station may transmit the CRS only in the frequency band corresponding to x RBs without extending the frequency band where the CRS is transmitted.

As another method, when a difference between N and x is 2 or more and x is larger than 6, the CRS may be transmitted in an area corresponding to (x−1) RBs including the center 6 RBs where the PBCH or the PSS/SSS is transmitted.

Referring to FIG. 10(C), it may be assumed that N corresponds to 19 RB and x is 11 RBs 1050. Since the difference between N and x is 2 or more and x is larger than 6, the base station may transmit the CRS in a frequency band 1060 of 10 RBs corresponding to x−1 including the center 6 RBs.

According to the exemplary embodiment of the present invention, when the CRS is transmitted to only some bands based on the center frequency in the frequency band of the NRB, if N is an odd number, the CRS is transmitted to all of y RBs (y is an odd number), and if N is an even number, the CRS may be transmitted to all of z RBs (z is an even number) (here, N is the system bandwidth, and y and z are configuration CRS bandwidths and integers which are smaller than or equal to N). By using the method, it is possible to prevent a case where the frequency band where the CRS is transmitted and the boundary of the RB do not coincide with each other from occurring. Accordingly, the frequency band which may not receive both the URS and the CRS among the frequency bands of the RBs does not exist, and the UE may enhance the demodulation performance of the PDSCH data.

The UE may use the CRS received through the NCT subframe for time/frequency tracking for the data received through the downlink channel. The base station may not transmit the NCT subframe so as to include the CRS in every subframe. Further, the base station may transmit the NCT subframe only through some frequency bandwidths (for example, center 6 RBs), not the entire system bandwidth.

Unlike the CRS defined in the existing LTE Release 8, a time/frequency tracking CRS which is newly defined in the NCT subframe may be called a sync-RS or a tracking-RS. Hereinafter, in the exemplary embodiment of the present invention, the CRS transmitted to the UE through the NCT subframe will be separately described by using a term called a time/frequency tracking CRS. However, the UE may use the CRS received through the NCT subframe for other purposes other than the purpose for the time/frequency tracking.

The time/frequency tracking CRS newly defined in the NCT subframe may be transmitted through a resource element defined for the CRS transmission of one specific antenna port, among resource elements used for the CRS transmission at antenna ports 0, 1, 2, and 3 defined in the LTE Release 8. The resource element defined for the time/frequency tracking CRS transmission is defined in cell-specific reference signals of 3GPP TS 36.211 v. 10.4.0 "3rd Generation Partnership Project; Technical Specification Group Radio Access Network; Evolved Universal Terrestrial Radio Access (E-UTRA); 6.10.1 of Physical Channels and Modulation (Release 10) opened in December, 2011.

Figure 11:
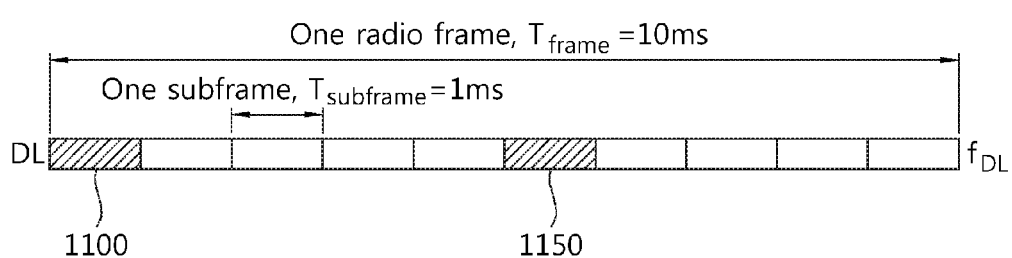
FIG. 11 is a schematic diagram illustrating a method for transmitting a time/frequency CRS according to an embodiment of the present invention.

FIG. 11 is a schematic diagram illustrating a method for transmitting a time/frequency tracking CRS according to an embodiment of the present invention.

In FIG. 11, the base station may transmit the time/frequency tracking CRS to the UE at a constant cycle (for example, 5 ms and a half frame unit).

Referring to FIG. 11, when the time/frequency tracking CRS is transmitted from the base station to the UE at a cycle unit of 5 ms, the base station may transmit the time/frequency tracking CRS to the UE through a first subframe 1100 and a sixth subframe 1150. The base station does not transmit the time/frequency tracking CRS in the remaining subframes of the frame.

As described above, in the subframe where the PBCH data or the PSS/SSS is transmitted, when the resource element for transmitting the PBCH data or the PSS/SSS and the resource element for transmitting the URS are duplicated, the base station does not transmit the URS in the duplicated resource element.

In this case, the time/frequency tracking CRS transmitted in the corresponding frequency band may be used for demodulation of the PDSCH data transmitted in the frequency band where the PBCH data or the PSS/SSS is transmitted.

A case where the base station transmits the PDSCH data through multiple antenna transmission such as transmit diversity may be assumed. When the base station transmits the PDSCH data through transmit diversity, the time/frequency tracking CRS may be transmitted to the UE through different resource areas according to the number of antennas used in a transmit diversity method. For example, in the case of performing multiple transmission using the transmit diversity by using two antennas, the UE may receive a first time/frequency tracking CRS transmitted by an antenna port x of the base station and a second time/frequency tracking CRS transmitted by an antenna port y of the base station. The UE may receive both the time/frequency tracking CRS transmitted by the antenna port x and the time/frequency tracking CRS transmitted by the antenna port y. The received CRS may be used so that the UE performs time/frequency tracking for the data transmitted in the base station and demodulates the received PDSCH data. Hereinafter, FIG. 12 illustrates a method for transmitting a time/frequency tracking CRS using the plurality of antennas in detail.

FIG. 12 is a schematic diagram illustrating a method for transmitting a time/frequency tracking CRS by using a plurality of antenna ports in the base station according to an exemplary embodiment of the present invention.

In FIG. 12, it is assumed that the base station diversity-transmits the time/frequency tracking CRS through two antenna ports. In this case, positions of time/frequency tracking CRS resources transmitted through two antenna ports of the base station may be differently configured. The base station may transmit a first time/frequency CRS at a first antenna port( ) and a second time/frequency CRS at a second antenna port( ). The UE may perform time/frequency tracking and PDSCH data demodulation based on the first and second time/frequency CRSs.

Referring to FIG. 12A, the base station may transmit the time/frequency tracking CRS through a first antenna port 1210 at every cycle of 5 ms in the entire system bandwidth for the time/frequency tracking. The first antenna port 1210 of the base station may transmit the time/frequency tracking CRS to the UE through the entire system bandwidth in a first subframe 1210-0 and a sixth subframe 1210-5.

The base station may transmit the time/frequency tracking CRS to the UE through the second antenna port 1220 in a frequency band (for example, center 6 RBs or 7 RBs) where the PBCH data or the PSS/SSS is transmitted or the frequency band including the frequency band where the PBCH data or the PSS/SSS is transmitted.

The UE may perform time/frequency tracking based on time/frequency tracking CRS transmitted by the first antenna port 1210 and the second antenna port 1220 and demodulation for the PDSCH data transmitted in the corresponding frequency band.

As another method for transmitting the CRS, referring to FIG. 12B, the base station may transmit the time/frequency tracking CRS through center x RBs at an interval of 5 ms in the first antenna port 1210 for the purpose of time/frequency tracking. The UE may receive the time/frequency tracking CRS through the first subframe 1250-0 and the sixth subframe 1250-5.

The base station may transmit the time/frequency tracking CRS for demodulating the PDSCH data included in the subframe where the PBCH data or the PSS/SSS is transmitted through the second antenna port 1260. The second antenna port 1260 of the base station may transmit the time/frequency tracking CRS through the center x RBs at an interval of 5 ms, like the first antenna port 1250. The UE may receive the time/frequency tracking CRS transmitted by the second antenna port 1260 through the first subframe 1260-0 and the sixth subframe 1260-5.

FIG. 12 exemplifies a case where the base station diversity-transmits the CRS through two antenna ports, and transmit diversity may be implemented by using two or more antenna ports, and the exemplary embodiment is also included in the scope of the present invention.

FIG. 13 is a schematic diagram illustrating a method for transmitting a time/frequency tracking CRS using a plurality of antennas according to the exemplary embodiment of the present invention.

FIG. 13 illustrates a case where a time/frequency tracking CRS is transmitted in a frequency band corresponding to some RBs in each subframe by using two antennas. In FIG. 13, it is assumed that transmit diversity using two antenna ports is used only in subframe 0 where the PSS/SSS and the PBCH data are transmitted.

Referring to FIG. 13A, an antenna port m may transmit a first time/frequency tracking CRS 1310 in the frequency band of 6 RBs corresponding to RB #3 1330-3 to RB #8 1330-8 in subframe #0 1300-0, subframe #1 1300-1, subframe #2 1300-2, subframe #3 1300-3, and subframe #4 1300-4.

An antenna port n may transmit a second frequency tracking CRS 1320 in the frequency band of 6 RBs corresponding to RB #3 1330-3 to RB #8 1330-8 of the subframe #0 1300-0. The first time/frequency tracking CRS and the second time/frequency tracking CRS may be CRSs defined in different resource areas.

The UE may be used for demodulating the PDSCH data included in the RBs transmitting the PSS/SSS and the PBCH data based on the first time/frequency tracking CRS 1310 received from the antenna port m and the second time/frequency tracking CRS 1320 received from the antenna n in the frequency band of 6 RBs of the first subframe. For example, the UE in the first subframe 1300-0 may perform the time/frequency tracking based on the second time/frequency tracking CRS 1320 and demodulate the PDSCH data based on the first time/frequency tracking CRS 1310.

Referring to FIG. 13B, the antenna port m of the base station may transmit a first time/frequency tracking CRS 1360 through the entire system frequency band corresponding to RB #0 1380-0 to RB #11 1380-11 in subframe #0 1350-0, subframe #1 1350-1, subframe #2 1350-2, subframe #3 1350-3, and subframe #4 1350-4.

The antenna port n of the base station may transmit a second time/frequency tracking CRS 1370 in a frequency band corresponding to RB #0 1380-0 to RB #8 1380-8 of the subframe #0 1350 including the RB transmitting the PBCH data and the PSS/SSS. The base station transmits the second time/frequency tracking CRS 1370 and the first time/frequency tracking CRS 1360 through different resource areas.

That is, the UE in the area corresponding to the center 6 RBs of the first subframe may demodulate the PDSCH data received based the first time/frequency tracking CRS and the second time/frequency tracking CRS which are transmitted through the first antenna port and the second port, respectively.

According to another exemplary embodiment of the present invention, unlike described above, a resource element transmitting the PBCH data or the PSS/SSS and a resource element transmitting the URS may not be duplicated. For example, in the case of transmitting a new pattern URS by changing the resource area in which the URS is transmitted in the related art, the resource element transmitting the PBCH data or the PSS/SSS and the resource element transmitting the URS may not be duplicated.

When the PBCH data or the PSS/SSS and the resource element transmitting the URS is not duplicated, the URS other than the CRS may be used for demodulating the PDSCH data received through the RB transmitting the PBCH data or the PSS/SSS.

In the case of using the URS as the reference signal, the base station may notify a physical resource block (PRB) bundling unit which is a unit for predicting a channel or estimating precoding matrix index (PMI)-related information based on the URS. The PRB bundling unit indicates a unit of the PRB which is precoded by using the same precoding vector. A set of the PRB bundled PRBs is referred to as a precoding resource block group (PRG).

The base station may precode the PRB-bundled PRBs based on the same downlink precoding matrix. That is, the UE may perform demodulation by performing common channel estimation of bundled resource blocks. The UE performs channel estimation on the assumption that the same PMI is used in a PRB bundling unit. The PRB bundling unit may be differently determined according to a system bandwidth.

When the URS performs the demodulation of the PDSCH data by using the reference signal, the UE may perform the demodulation under the assumption that the URS included in the PRB of the same PRG and the PDSCH data are data to which the same precoding matrix is applied. Accordingly, when the UE performs the demodulation for the PDSCH data after predicting the channel or estimating the PMI-related information by using the URS of the PRB included in the PRG to which different precoding matrixes are applied.

The UE may acquire a symbol timing by using the received PSS and SSS in the initial stages, synchronize a frequency, and acquire system bandwidth information included in the MIB received through the PBCH after detecting cell information. The MIB may include information such as a downlink cell bandwidth and a system frame number. That is, system bandwidth information may not be determined before the PBCH data is received in order to acquire the initial system information. According to the exemplary embodiment of the present invention, the UE may assume that the PRB including the PBCH data is data included in one PRG to which the same PRB bundling is applied.

That is, the UE may perform demodulation under the assumption that the data received through the PBCH is the data precoded based on the same precoding matrix.

FIG. 14 is a schematic diagram illustrating a PRB bundling method according to the exemplary embodiment of the present invention.

Referring to FIG. 14A, a size of a PRG 1400 may be a size of a frequency band in which PBCH data 1410 is transmitted. For example, when the frequency band in which PBCH data 1410 is transmitted is 6 RBs, the UE may perform the demodulation for the PDSCH data 1410 received in the corresponding frequency band under the assumption that 6 RBs transmitting the PBCH data 1410 is one PRG 1400.

After the UE performs accessing with the base station, even though the size of the PRB bundling is newly configured between the UE and the base station, the newly configured PRB bundling may be applied in the resource area where the PBCH data 1410 is transmitted. The UE may perform the demodulation under the assumption that the resource area receiving the PBCH data 1410 is one PRG 1400.

Further, as another method, it may be assumed that the size of the PRG applied to the frequency resource where the PBCH data is transmitted is the size of the PRG used in the entire system bandwidth.

Referring to FIG. 14B, the UE may demodulate data received through different resource areas under the assumption that the size of the PRG 1420 used in the resource area where PBCH data 1460 is transmitted is the size of the PRG 1420 used in the entire system bandwidth 1450.

When the base station transmits the PBCH data to the UE through the NCT subframe, the UE may use the CRS and the URS as the reference signal for demodulating the received PBCH data. A method of using the CRS and the URS as the reference signal for demodulating the PBCH data received through the NCT subframe will be described below.

Figure 15:
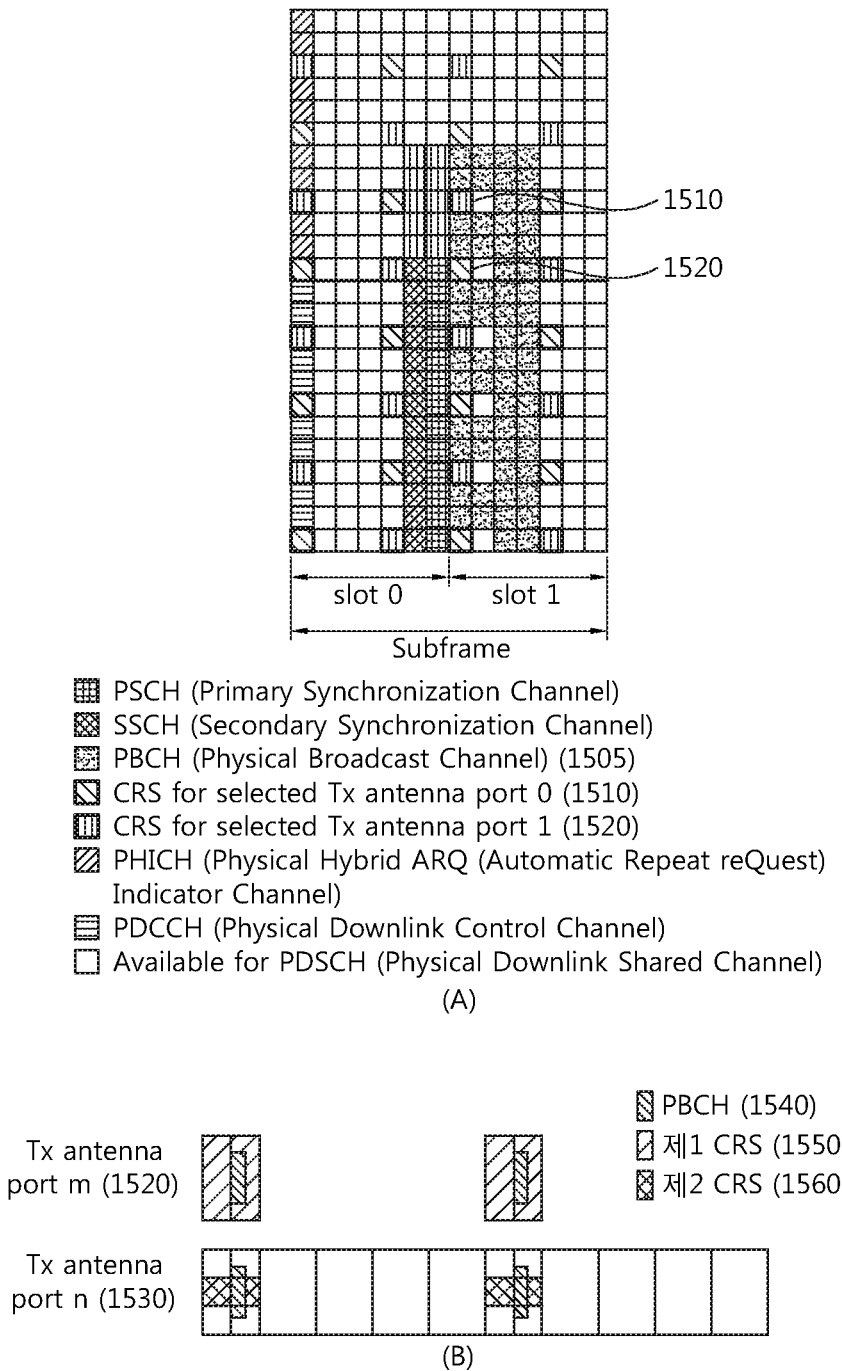
FIG. 15 is a schematic diagram illustrating a method for transmitting a CRS to an NCT subframe according to the exemplary embodiment of the present invention.

FIG. 15 is a schematic diagram illustrating a method for transmitting a CRS to an NCT subframe according to the exemplary embodiment of the present invention.

Referring to FIG. 15A, a case where the UE receives PBCH data 1505 through the NCT subframe and uses a time/frequency tracking CRS 1515 as a reference signal for demodulating the PBCH data 1505 is illustrated.

The base station may always include and transmit a time/frequency tracking CRS 1500 in the subframe transmitting the PBCH data 1505. In order to reduce overhead due to transmission of an additional CRS, the PBCH data may be transmitted by using only a single antenna port. In this case, the base station may not leave the resource area 1510 defined for the CRS transmission of another antenna port as the area for transmitting the CRS, but use the resource area 1510 as the resource area for transmitting the PBCH data 1505. Like the CRS used for demodulation of the PDSCH data included in the RB transmitting the PBCH data or the PSS/SSS, the base station may transmit the CRS used for the demodulation of the PBCH information. As described above, it may be assumed that the frequency band corresponding to the center x RBs (N>=x, x is a natural number) is a configuration CRS frequency band, in a system having the system bandwidth of N RBs (N is a natural number). When a value of N mod 2 and a value of x mod 2 are not the same as each other, the UE may use the received PBCH data for the demodulation by further transmitting the CRS to an additional CRS frequency band so as to transmit the CRS in the frequency band corresponding to the center (x+1) RBs.

Referring to FIG. 15B, a case where the UE receives PBCH data 1540 through the NCT subframe and uses a time/frequency tracking CRS as a reference signal for demodulating the PBCH data 1540 is illustrated.

The base station may diversity-transmit the PBCH data 1540. The CRS defined in different resource areas may be diversity-transmitted based on the number of antenna ports used in the transmit diversity.

The UE may perform the time/frequency tracking and the demodulation of the PDSCH data based on the CRS received from the plurality of antenna ports of the base station. For example, the base station may diversity-transmit the PBCH data 1540 through two antenna ports (m antenna port 1520 and n antenna port 1530). In the case, the m antenna port 1520 of the base station may transmit a first time/frequency tracking CRS 1550 in the RBs corresponding to the entire system bandwidth at every cycle of 5 ms for the purpose of time/frequency tracking. The n antenna port 1530 of the base station may transmit a second time/frequency tracking CRS 1560 in the frequency band corresponding to center 6 RBs or 7 RBs to use the transmitted a second time/frequency tracking CRS 1560 for PDSCH demodulation. The CRS transmitted for time/frequency tracking may be transmitted in some frequency bands other than the entire system bandwidth.

FIG. 16 is a schematic diagram illustrating a method for transmitting a URS in the NCT subframe according to the exemplary embodiment of the present invention.

Referring to FIG. 16, when the base station transmits the PBCH data to the UE through the NCT subframe, a case of using the URS as a reference signal for demodulating the PBCH data in the UE is illustrated. The UE may perform the demodulation for the PBCH data by using the URS without using the CRS.

When the CRS is not used as the reference signal, PBCH data 1600 may be transmitted in a resource area of the CRS defined in the RB transmitting the PBCH data.

Initialization of a scrambling sequence of the URS used for demodulating the PBCH data 1600 may be performed by the following Equation 1.

$$c_{init}=(\lfloor n_s/2 \rfloor+1)\cdot(B+1a)\cdot 2^{16}+n_{SCID} \qquad \text{<Equation 1>}$$

Here, B is a value corresponding to a cell ID or a value set in a higher layer having the same range as the cell ID, and nSCID may be set and used as a fixed value of 0 or 1.

When the UE demodulates the PBCH data based on the URS, the UE may demodulate the PBCH data based on the URS received from the single antenna port. The UE receiving the PBCH data may not determine information on antenna configuration of the base station.

The UE may assume that the same precoding as the URS is applied to the data received through the same RB as the received RB. When the UE performs the channel prediction or the estimation of the PMI-related information by using the URS included in the PRB applying different precoding, the demodulation performance of the UE may be deteriorated.

That is, system bandwidth information may not be determined before the PBCH data is received in order to acquire the initial system information. Accordingly, the UE assumes that the PRB where the PBCH data is transmitted is the PRG to which one PRB bundling is applied. That is, in the frequency area where the PBCH is transmitted, a receiver may perform demodulation under the assumption that the precoding is not changed. Even though the PRB bundling unit is differently configured after the UE performs access to the base station, the PRB bundling unit configured for the resource area where the PBCH data is transmitted is not applied.

Further, as another method, it may be assumed that a PRB bundling value used in the resource area in which the PBCH data is transmitted is a PRB bundling value used in the entire system bandwidth.

Even for demodulating the PDSCH data included in the RB transmitting the PBCH data, it is assumed that the same PRB bundling as the PRB bundling applied to the PBCH data is used. Since the PDSCH data included in the same RB as the RB where the PBCH data is transmitted performs the demodulation by using the URS used for demodulating the PBCH data, it is assumed that the same transmission mode is used.

Further, as another method, when the PBCH is demodulated based on the URS, the UE may perform the demodulation without assuming that the PRB bundling is performed in the resource area where the PBCH data is transmitted.

The base station may signalize information about whether the PRB bundling is performed to the UE. As a method for signalizing information about whether the PRB bundling is performed to the UE, a PRB bundling window size is configured as 1 and the base station may indicate, to the UE, that the PRB bundling is performed.

Figure 17:
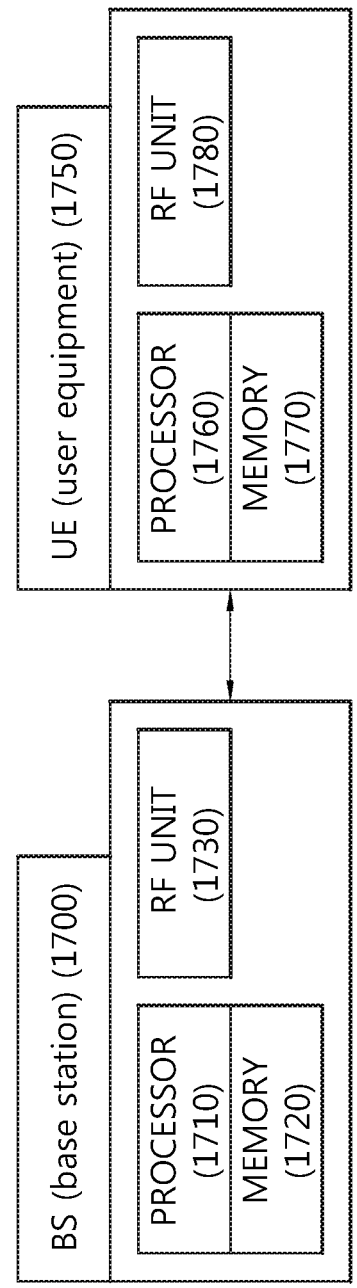
FIG. 17 is a block diagram illustrating a wireless communication system according to an embodiment of the present invention

FIG. 17 is a block diagram illustrating a wireless communication system according to an embodiment of the present invention.

Referring to FIG. 26, a base station 2500 includes a processor 1710, a memory 1720, and a radio frequency (RF) unit 1730. The memory 1720 is connected with the processor 1710 to store various information for driving the processor 2610. The RF unit 1720 is connected with the processor 1710 to transmit and/or receive a radio signal. The processor 1710 implements a function, a process, and/or a method which are proposed. In the aforementioned embodiment, the operation of the base station may be implemented by the processor 1710.

For example, the processor 1710 may determine the size of the frequency band where the CRS is transmitted by considering the size of the entire system bandwidth.

A wireless device 1750 includes a processor 1760, a memory 1770, and an RF unit 1780. The memory 1770 is connected with the processor 1760 to store various information for driving the processor 1760. The RF unit 1780 is connected with the processor 1760 to transmit and/or receive a radio signal. The processor 1760 implements a function, a process, and/or a method which are proposed. In the aforementioned embodiment, the operation of the wireless device may be implemented by the processor 1760.

For example, the processor 1760 may determine the size of the frequency band where the CRS is transmitted by considering the size of the entire system bandwidth.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for receiving reference signals by a terminal, the method comprising:
   receiving signals from a cell; and
   determining whether a reference signal (RS) is transmitted on a subframe which includes at least one physical resource block (PRB) smaller than a plurality of PRBs of a system bandwidth,
   wherein if a physical broadcast channel (PBCH) is transmitted on the subframe, it is determined that the RS is transmitted on the subframe,
   wherein the subframe on which the RS is transmitted is pre-defined,
   wherein the PBCH and the RS are transmitted using one or two same antenna ports,
   wherein if the PBCH is transmitted using two antenna ports, the RS is transmitted using the same two antenna ports.

2. The method of claim 1, wherein the RS is transmitted with at least one antenna port that is different from an antenna port for a cell-specific reference signal (CRS).

3. The method of claim 1, wherein the subframe is not used for at least one of a plurality of physical downlink channels including a physical control format indicator channel (PCFICH) and a physical hybrid ARQ indicator channel (PHICH).

4. The method of claim 1, further comprising using the RS to demodulate the PBCH.

5. The method of claim 1, wherein if the PBCH is not transmitted via the subframe, it is determined that the RS is not transmitted on the subframe.

6. The method of claim 1, wherein if the RS is transmitted using the same two antenna ports as the PBCH, the RS is used to demodulate the PBCH.

7. The method of claim 1, wherein if the RS is transmitted using the same two antenna ports as the PBCH, the RS is used to perform channel estimation for the PBCH.

8. A terminal for transmitting a Radio Resource Control (RRC) connection request message, the terminal comprising:
   a transceiver that transmits and receives signals; and
   a processor that controls the transceiver to receive signals from a cell and determines whether a reference signal (RS) is transmitted on a subframe which includes at least one physical resource block (PRB) smaller than a plurality of PRBs of a system bandwidth,
   wherein if a physical broadcast channel (PBCH) is transmitted on the subframe, it is determined that the RS is transmitted on the subframe,
   wherein the subframe on which the RS is transmitted is pre-defined,
   wherein the PBCH and the RS are transmitted using one or two same antenna ports,
   wherein if the PBCH is transmitted using two antenna ports, the RS is transmitted using the same two antenna ports.

9. The terminal of claim 8, wherein the RS is transmitted with at least one antenna port that is different from an antenna port for a cell-specific reference signal (CRS).

10. The terminal of claim 8, wherein the subframe is not used for at least one of a plurality of physical downlink channels including a physical control format indicator channel (PCFICH) and a physical hybrid ARQ indicator channel (PHICH).

11. The terminal of claim 8, wherein the processor further uses the RS to demodulate the PBCH.

12. The terminal of claim 8, wherein if the PBCH is not transmitted via the subframe, it is determined that the RS is not transmitted on the subframe.

13. The terminal of claim 8, wherein if the RS is transmitted using the same two antenna ports as the PBCH, the RS is used to demodulate the PBCH.

14. The terminal of claim 8, wherein if the RS is transmitted using the same two antenna ports as the PBCH, the RS is used to perform channel estimation for the PBCH.

* * * * *